United States Patent Office.

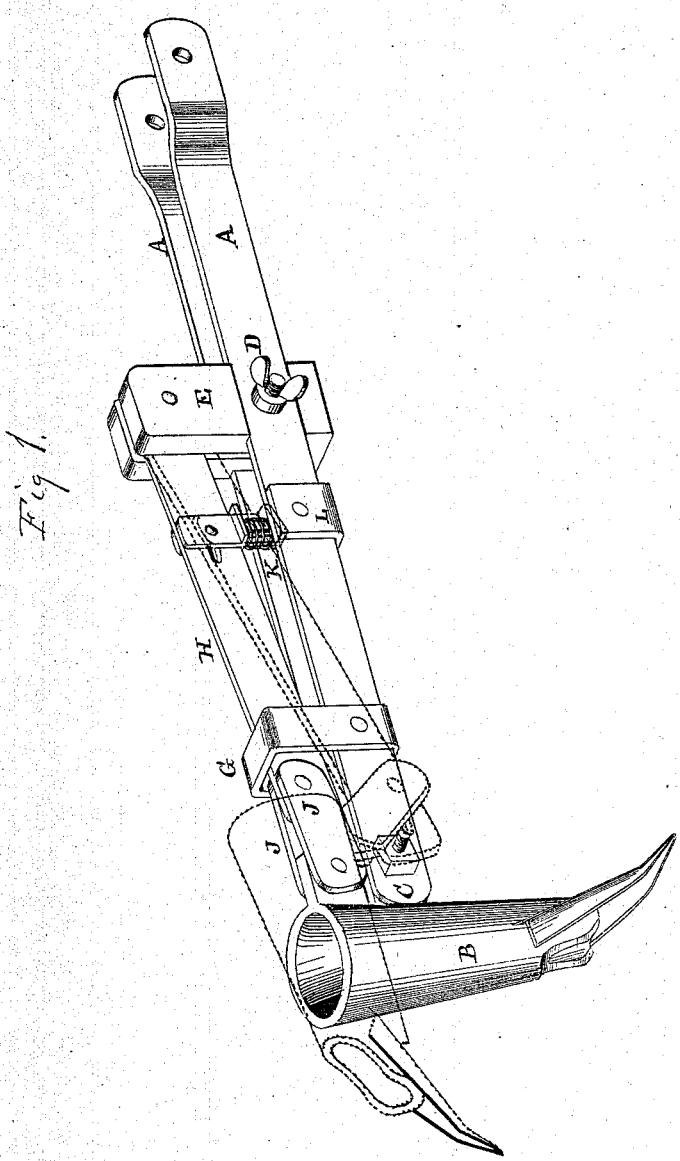

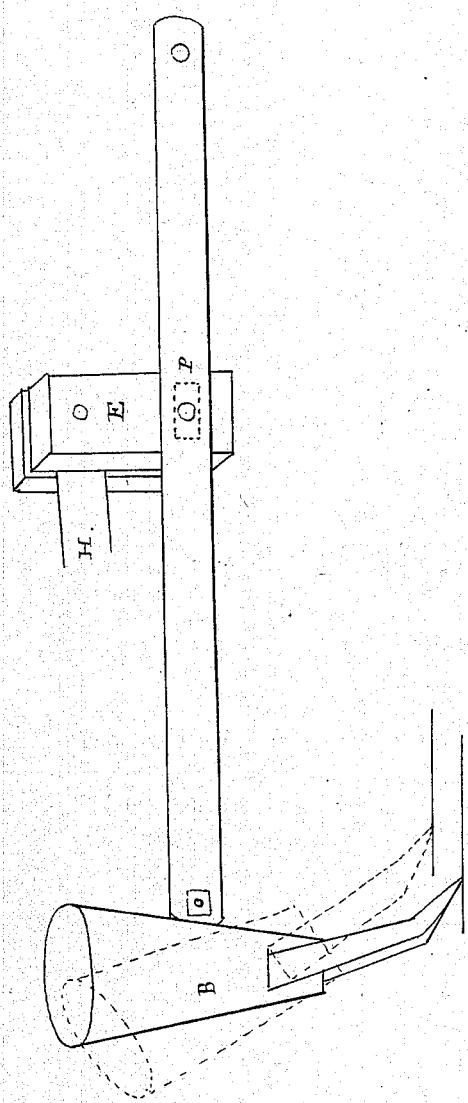

JOHN F. KELLER, OF HAGERSTOWN, MARYLAND, ASSIGNOR TO HIMSELF AND WILLIAM UPDEGRAFF, OF SAME PLACE.

Letters Patent No. 105,810, dated July 26, 1870.

IMPROVEMENT IN DRILLS FOR SEED-PLANTERS.

The Schedule referred to in these Letters Patent and making part of the same.

*To all whom it may concern:*

Be it known that I, JOHN F. KELLER, of Hagerstown, Washington county, State of Maryland, have invented new and useful Improvements in Spring-Shovels or Drills for Seed-Planters; and I do hereby declare the following to be an exact description of the same, reference being had to the accompanying drawings, and to the letters of reference marked thereon making a part of this specification.

The nature of my invention consists in the arrangement of the slide-block operating between the drag-bars, (adjusted by a set-screw,) for regulating the position of the shovels to plow shallow or deeper. Also, the check-clevis for holding the spring bar in its proper place, when combined with the drag-bars as herein shown.

To enable others to make and use my invention, I will proceed to describe its construction and operation.

A represents the drag-bars, with the shovel B attached to the rear end by the screw-bolt C.

D is the set-screw that holds the slide-block E in its place, the slide-block being adjustable between the drag-bars, and movable back and forward for the purpose of regulating the shovel to plow shallow or deeper, as may be required.

G is a clevis, that is fastened to the drag-bars, is square shaped, and is intended as a check-clevis, to hold the spring bar H to its place, the spring bar H being attached to the center of the sliding block E and to the joints J J, so that, when the shovel strikes any obstruction, the point of the shovel flies back, (as shown by the red lines,) the points J J and rear end of the spring bar H yielding to the pressure downward between the drag-bars A A until the shovel has passed over the obstacle, when the spiral spring K forces the spring bar H and joints upward and back to their place, where they are held by the clevis G, and the shovel is again in its proper position for operation. And when the point of the shovel B is required to be set to plow shallow, the slide-block E is moved and adjusted forward from the shovel, and, when required to run deeper, the slide-block is slightly moved toward the shovel, and secured by the set-screw or tap D, and thus the point of the shovel is set forward or back to the proper inclination required to deepen the furrow.

L is the square brace attached to the drag-bars A, that is the seat of the spiral spring K, while the top of the spring K is permanently fastened to the spring bar H, so as to yield with the movement of the shovel, and to keep the spring bar H in its proper horizontal position.

Figure 2 is an additional drawing to show how the block E works on a slot, P, and changes the angle of the hoe so as to plow deep or shallow.

What I claim as my invention, and desire to secure by Letters Patent, is—

The slide-block E, or its equivalent, working between or in the drag-bars, for changing the angle of the hoe, so as to plow deep or shallow, as herein described and for the purpose set forth.

JOHN F. KELLER.

Witnesses:
Z. B. CLARK,
WM. BUNBURY.